Sept. 6, 1932.   J. C. HEINTZ   1,875,727
ADJUSTABLE CAVITY REPAIR VULCANIZER
Filed May 31, 1930

INVENTOR
JAMES C. HEINTZ
BY
Ely & Barrow,
ATTORNEYS

Patented Sept. 6, 1932

1,875,727

UNITED STATES PATENT OFFICE

JAMES C. HEINTZ, OF LAKEWOOD, OHIO

ADJUSTABLE CAVITY REPAIR VULCANIZER

Application filed May 31, 1930. Serial No. 457,976.

The present invention relates to new and useful improvements in repair vulcanizers, and particularly to improved means operating in combination which secure a range of adjustment and adaptability having many advantages over prior constructions for this purpose.

In the manufacture of repair vulcanizers it has been customary to provide a large range of cavities of varying sizes which are required in order to enable the repairman to operate upon the different sizes of tires which come to the shop. The installation of the increased equipment which is required to keep pace with the changes and variations in sizes of tires, and especially of large tires, increases the investment to such an extent that a smaller shop cannot operate economically or efficiently.

It is the object of the present invention to design and construct a vulcanizer equipment of the cavity type which is quickly and easily adjusted to accommodate a large range of tire sizes in a single cavity vulcanizer. The designing of equipment for this purpose which will enable a tire repairman to handle a large range of sizes of tires in a single cavity vulcanizer is a very considerable advance in the art.

By the use of the apparatus here shown and described, a single cavity vulcanizer can be quickly and easily adjusted to the size required, and the resultant cavity after the adjustment is secured will fit the tire accurately so that efficient repairs may be obtained. The designing of the cavity mold and the interchangeable filler pieces brings the cavity to the exact size and shape required, the device providing a simple and effective method for reducing a fixed cavity or shell of maximum size to any of the various sizes as required.

In the drawing which accompanies this application are shown in somewhat diagrammatic form, the various adjustment which are obtainable by the use of the improved equipment. The drawing omits certain of the well known and well understood attachments for this purpose, as such can be readily supplied by one skilled in the art, from standard equipment available. The showing is sufficient to enable one having practical knowledge of the art to practise the invention. The principles of the invention may be applied to sectional, or full circle repair devices.

The invention has as its object the securing of the requisite adjustments with a minimum number of parts, and while only four adjustments are shown, it will be obvious that, having explained the invention, the principles thereof can be extended for a much greater range than shown.

In each of the views the cavity vulcanizer proper, or fixed shell, is indicated at 10, being chambered as indicated for heating by steam. It will be evident that the vulcanizer may also be heated electrically, or by any other well known means. The cavity or shell is shown in cross section only, it being understood that it is curved longitudinally to conform to the circumference of the tire.

It is particularly noted that the side walls of the mold in the illustrated embodiment of the invention, are straight or at a tangent to the median plane or widest portion of the tire, and then converge outwardly of the tire along the inclined surfaces 12, which are parallel to and correspond with the shoulders of the tire. This formation of the sides of the cavity which brings the outer or lowermost portion thereof alongside of the tire, is an important feature of the invention, as it enables the adjustments to be obtained with the minimum number of fillers or plates. The outermost portion or base 15 of the cavity is flat as shown. To fill the cavity and make it conform to the curved thread portion of the tire, two divided tread plates or fillers 16 are provided which jointly fill the bottom of the cavity. These tread filler plates are flat on their outer surfaces to fit the surface 15, and are curved on their upper surfaces to fit the transverse and circumferential curvatures of the tread of the tire. In the adjustment shown in Figure 1, the tread filler plates completely fill the space between the side walls of the cavity. In each instance, as described, the tread fillers may be in one, or a plurality of pieces as found advisable.

Figure 1:
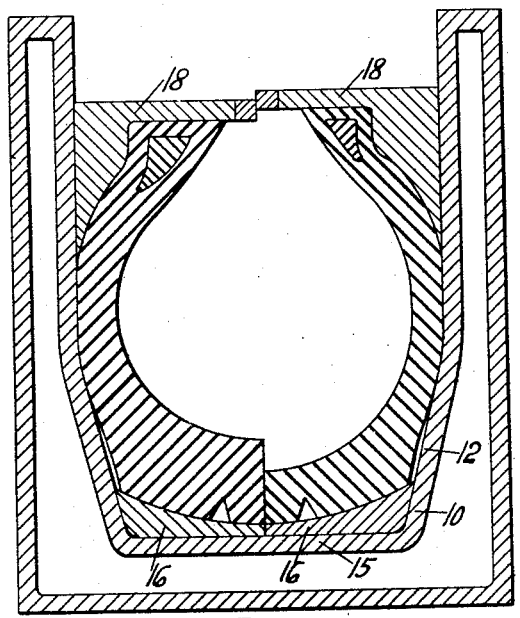
Figure 1 is a cross sectional view through a cavity vulcanizer showing the manner in which the largest sizes of tires are positioned, the drawing showing on opposite sides thereof different tires as they are accommodated in the vulcanizer.

In the invention as illustrated in Figure 1, a standard 8 inch heavy duty tire is shown at the left, and a standard 9 inch bus-balloon tire is shown at the right, the cavity accommodating either of said sizes as shown. The usual bead plates are indicated at 18.

Figure 3:
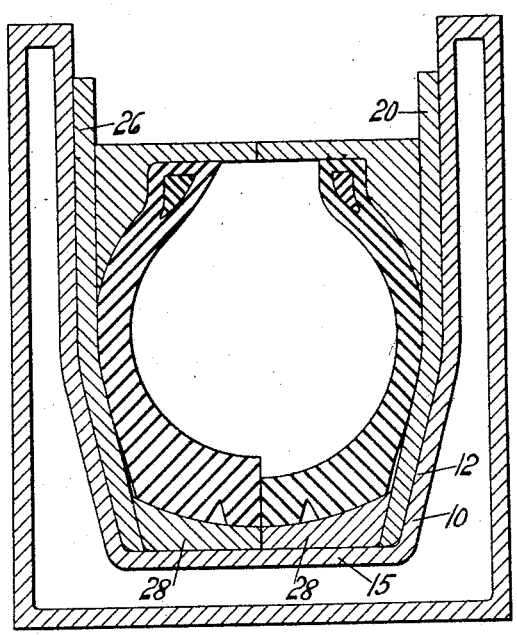
Figures 3 and 4 show adjustments for still smaller sizes.

In the manner shown in Figure 3, a 7 inch heavy duty tire has been accommodated by the addition of an oppositely positioned reducing plate 26 which, located opposite the plate 20, reduces the width of the cavity to the proper dimension. It will be observed that by making these reducing plates one-half of an inch in cross section, the requisite fractional cross-section sizes of tires may be accommodated by the addition of individual plates. In the tread area the smaller tread filler plates 28 are located, these filler plates being of the required cross section and contour to conform to the transverse and circumferential curvatures of the tire.

Figure 4:
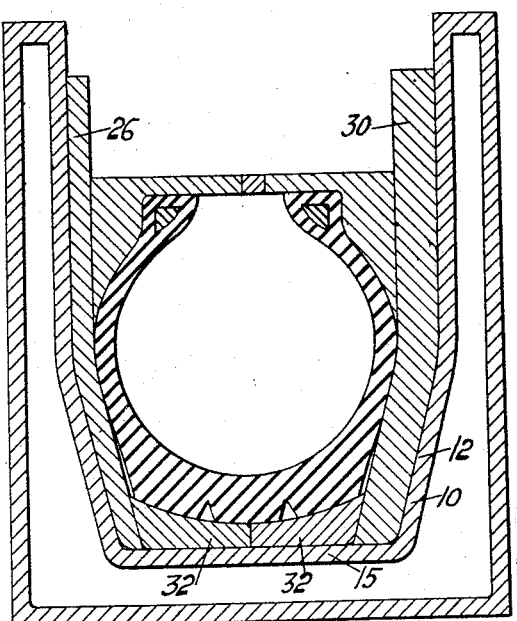

In the manner shown in Figure 4 the cavity is still further reduced to accommodate a 7 inch balloon tire, which result in accomplished by the addition of a somewhat thicker reducing plate 30 at one side of the cavity, this reducing plate is preferably one inch in thickness which, with the plate 26 located oppositely, gives the requisite reduction for the next size of tire without changing the contour of the tire cavity. The thicker plate is employed rather than two thinner reducing plates to secure better heat conduction. The smaller tread filler pieces 32 of the same depth as the plates 28 complete the cavity.

Figure 2:
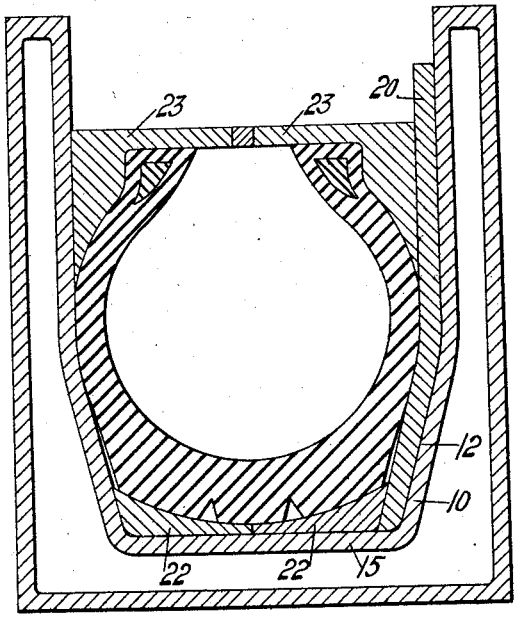
Figure 2 shows the adjustment for the next smaller tire.

In the adjustment shown in Figure 2, the same cavity or shell is shown, but in this case a side or reducing plate has been added to one side of the cavity. This plate, which bears the numeral 20 is of the same contour on both its inner and outer surfaces as the side wall 10, and fits snugly against the side wall so as to convey the heat from the cavity to the tire by conduction. Particularly reference is made to the fact that the sides of this plate are parallel so that, although the size of the cavity is reduced, its general form and proportions are not altered and the two sides of the effective tire cavity are in conformity. With the reducing plate in position, the cavity is completed by the addition of the smaller tread filler plates 22. In this form it will be observed a so-called 8.25 bus balloon tire is accommodated, the bead plates 23 being used as adaptable for this size of tire.

In the manner shown in Figure 3, a 7 inch heavy duty tire has been accommodated by the addition of an oppositely positioned reducing plate 26 which, located opposite the plate 20, reduces the width of the cavity to the proper dimension. It will be observed that by making these reducing plates one-half of an inch in cross section, the requisite fractional cross-section sizes of tires may be accommodated by the addition of individual plates. In the tread area the smaller tread filler plates 28 are located, these filler plates being of greater depth than in the previously described arrangements.

In the manner shown in Figure 4 the cavity is still further reduced to accommodate a 7 inch balloon tire, which result is accomplished by the addition of a somewhat thicker reducing plate 30 at one side of the cavity, this reducing plate is preferably one inch in thickness which, with the plate 26 located oppositely, gives the requisite reduction for the next size of tire without changing the contour of the tire cavity. The thicker plate is employed rather than two thinner reducing plates to secure better heat conduction. The smaller tread filler pieces 32 of the same depth as the plates 28 complete the cavity.

It will be apparent that the principles of the invention may be carried on for still greater reductions, by various changes and permutations, but in every instance the original cavity or shell is unchanged. This result is possible, due to the shape of the cavity in the shell, and the fact that the side reducing plates are provided with parallel sides. It is also made possible by forming the base or lowermost portion of the shell flat or straight across. A curved surface at this point would make the range of adjustments impossible. With a single vulcanizer shell of the form shown herein, and with a set of reducing side plates and tread filler plates, it is made possible for a tire repairman to vulcanize any size of tire in a single cavity vulcanizer, a result not obtainable in the devices of the prior art.

What is claimed is:

1. In an adjustable cavity vulcanizer, a mold of maximum size having side and base walls, the side walls converging from the median line to the base wall in lines substantially symmetrical to the shoulders of the tire, the base wall being formed upon a straight line, in combination with a removable and replaceable tread filler having a flat base resting upon the base wall of the mold, and having a curved upper surface to conform to the tread of the tire, and a removable and replaceable side reducing plate of even thickness throughout, having side walls corresponding to the contour of a side wall of the mold, and extending to and resting upon the straight line base wall of the mold.

2. In an adjustable cavity vulcanizer, a mold of maximum size having side and base walls, the side walls converging from the median line to the base wall in lines substantially symmetrical to the shoulders of the tire, the base wall being formed upon a straight line, in combination with removable and replaceable cavity reducing means comprising a set of tread filler plates of varying thicknesses and contours upon their upper surfaces to fit various sizes of tires, and having flat under surfaces to rest upon the base of the mold, and side reducing plates of uniform thickness throughout, having side walls corresponding to the contour of the side wall of the mold, and extending to and resting upon the straight line base wall of the mold.

3. In an adjustable cavity vulcanizer, a mold of maximum size having side and base walls, the side walls converging from the median line to the base wall in lines substantially symmetrical to the shoulders of the tire, the base wall being formed upon a straight line, in combination with removable and replaceable cavity reducing means comprising a set of tread filler plates of varying thicknesses and contours upon their upper surfaces to fit various sizes of tires, and having flat under surfaces to rest upon the base of the mold, and side reducing plates of varying thicknesses, but each of uniform thickness throughout, having side walls corresponding to the contour of the side wall of the mold and extending to and resting upon the straight line base wall of the mold.

4. In an adjustable cavity vulcanizer, a mold of maximum size having sloping side walls, a base wall formed on a straight line, a removable and replaceable tread filler having a flat base resting upon the base wall of the mold and a curved upper surface to conform to the tread of the tire, said filler being narrower than said mold and having its side walls sloped to correspond with the side walls of the mold and a removable and replaceable side reducing plate resting on the base wall of the mold and fitting between a side wall of the tread filler and the inside wall of the mold.

5. In an adjustable cavity vulcanizer, a mold of maximum size having side and base walls, the side walls converging from the median line to the base wall in lines substantially symmetrical to the shoulders of the tire, the base wall being formed on a straight line, and a removable and replaceable side reducing plate having its side walls corresponding to the contour of the side walls of the mold and having its outer end resting on the straight line bottom wall of the mold.

6. In an adjustable cavity vulcanizer, a mold of maximum size having side and base walls, the side walls converging from the median line to the base wall in lines substantially symmetrical to the shoulders of the tire, the base wall being formed upon a straight line, and side reducing plates of varying thickness, having side walls corresponding to the contour of the side walls of the mold and having their outer ends resting on the straight line bottom wall of the mold.

7. In an adjustable cavity vulcanizer, a mold having side and base walls, the base wall being formed upon a straight line, in combination with a removable and replaceable tread filler having a flat base resting upon the base wall of the mold, and having a curved upper surface to conform to the tread of the tire, and a removable and replaceable side reducing plate, having side walls resting against the side wall of the mold and extending to and resting upon the straight line base wall of the mold.

8. In an adjustable cavity vulcanizer, a mold having side and base walls, the base wall being formed upon a straight line, in combination with removable and replaceable cavity reducing means comprising a set of tread filler plates of varying thicknesses and contours upon their upper surfaces to fit various sizes of tires, and having flat under surfaces to rest upon the base of the mold, and side reducing plates having side walls resting against the side walls of the mold and extending to and resting upon the straight line base wall of the mold.

9. In an adjustable cavity vulcanizer, a mold having side and base walls, the base wall being formed on a straight line, and a removable and replaceable side reducing plate having its side walls corresponding to the contour of the side walls of the mold and having its outer end resting on the straight line bottom wall of the mold.

10. In a adjustable cavity vulcanizer, a mold having side and base walls, the base wall being formed on a straight line, a removable and replaceable tread filler having a flat base resting upon the base wall of the mold and a curved upper surface to conform to the tread of the tire, said filler being narrower than said mold, and a removable and replaceable side reducing plate resting on the base wall of the mold and fitting between the side of the tread filler and a side wall of the mold.

JAMES C. HEINTZ.